Feb. 4, 1969     H. O. SCHERENBERG     3,425,400
LIQUID COOLING SYSTEM OF AN INTERNAL COMBUSTION ENGINE
Filed Oct. 27, 1966
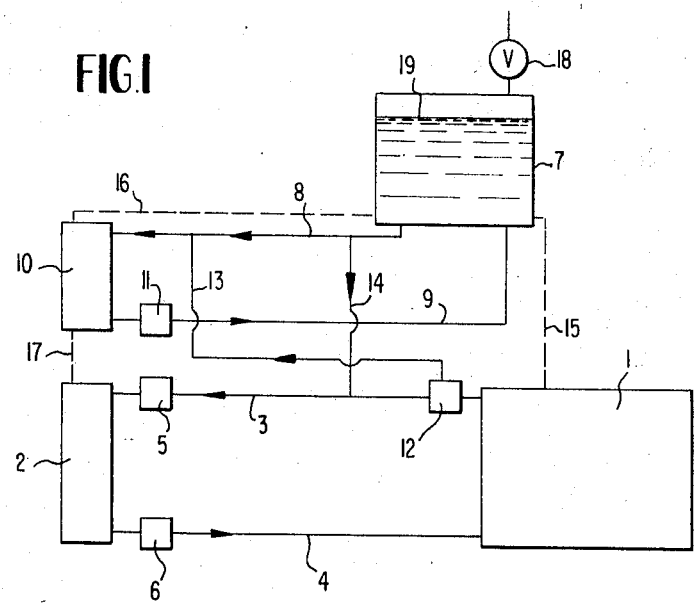
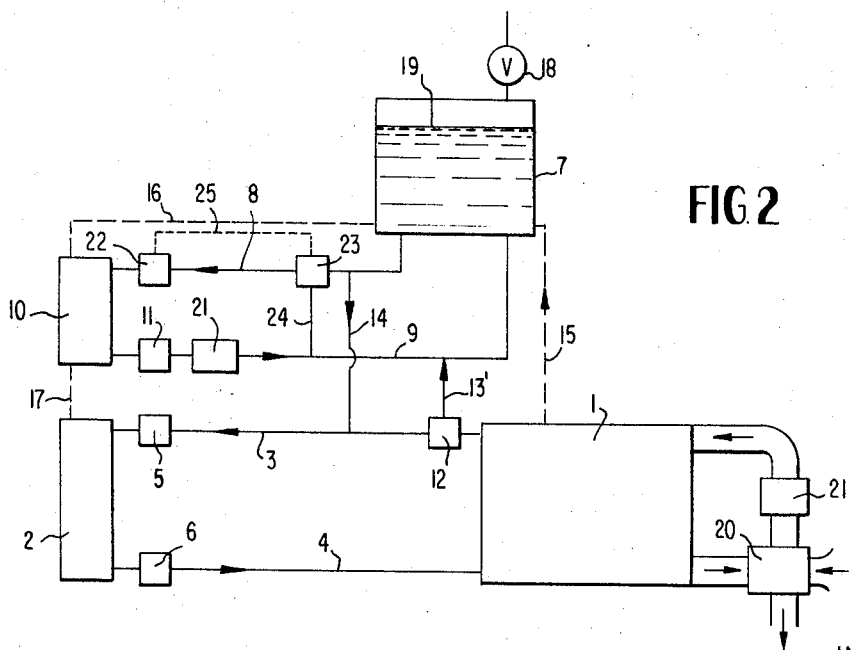
INVENTOR
HANS O. SCHERENBERG
BY *Dicke + Craig*
ATTORNEYS United States Patent Office 3,425,400
Patented Feb. 4, 1969

3,425,400
LIQUID COOLING SYSTEM OF AN INTERNAL COMBUSTION ENGINE
Hans O. Scherenberg, Stuttgart-Heumaden, Germany, assignor to Daimler-Benz Aktiengesellschaft, Stuttgart-Unterturkheim, Germany
Filed Oct. 27, 1966, Ser. No. 589,986
Claims priority, application Germany, Oct. 28, 1965, D 48,535
U.S. Cl. 123—41.08    19 Claims
Int. Cl. F01p 7/16, 3/12; F02b 41/00

ABSTRACT OF THE DISCLOSURE

A fluid cooling system for an internal combustion engine including a main cooling circulatory system and an auxiliary cooling circulatory system wherein either the entire auxiliary cooling system or only a reservoir therein may be selectively connected to the main cooling system through thermostatic control, a portion of the auxiliary cooling system being available for cooling a charging-air line connected to the internal combustion engine.

---

The present invention relates to a liquid cooling system of an internal combustion engine having a cooler or condenser, a cooling-liquid pump and a cooling circulatory system provided with a thermostat.

It is disadvantageous with such known cooling systems that as a rule they have to be designed for the practically possible maximum load if under extreme operating conditions, i.e., for example, at a full load, or under emergency power operation with an atmospheric air temperature of 50° C., no cooling difficulties are to arise. Consequently, very large coolers or condensers are needed for the usual cooling systems in relation to the normal load thereof.

The present invention aims at avoiding aforementioned shortcomings without, however, having to expect cooling difficulties during temporary full-load or emergency power operations.

The underlying problems are solved in accordance with the present invention in that the cooling circulatory system of the aforementioned liquid-cooling system is designed for a cooling performance or output lying below its practically possible maximum load and in that an auxiliary cooling circulatory system is associated therewith normally connected only to a reservoir or tank and therewith adapted to be cooled to a low temperature whereby upon exceeding a predetermined temperature of the main circulatory system, the auxiliary circulatory system is adapted to be connected with the main circulatory system.

If the cooling circulatory system is designed, for example, only for a half-load operation with an outside or atmospheric air temperature of 50° C., then in the case of a longer full-load operation and a corresponding exceeding of the maximum permissive cooling water temperature as measured by the thermostat, the auxiliary cooling circulatory system can be operatively connected with the main circulatory system. Owing to the fact that the reservoir or tank is filled with a cooling liquid cooled down to a low temperature, a more or less long full-load or emergency power output operation may be carried out depending on the quantity of water in the reservoir or tank and on the outside air temperature even in the case when the two coolers or condensers combined cannot produce the necessary cooling output. Furthermore, one is readily in a position with the subdivision of the cooling surface into two coolers or condensers to accommodate these two coolers more readily corresponding to the given constructional conditions than is possible with a single cooler or condenser.

According to one constructional embodiment of the present invention, a control valve adapted to be controlled by the thermostat disposed in the line of the main circulatory system leading from the combustion engine to the cooler or condenser, is connected ahead of or upstream of the thermostat, which control valve selectively conducts the cooling liquid leaving the internal combustion engine above a predetermined temperature by way of the first branch line into the line leading from the reservoir or tank to the cooler or condenser of the auxiliary cooling circulatory system at a place disposed directly upstream of the cooler or condenser whereby a second branch line branches off from this line downstream of and close to the tank or reservoir which terminates in or discharges into the said line of the main circulatory system between the control valve and the thermostat.

According to another constructive embodiment of the present invention in conjunction with a conventional supercharging means of the internal combustion engine, a charging-air cooler which is operatively connected in the charging-air line downstream of the supercharger, is operatively connected downstream of a cooling liquid pump of the auxiliary cooling circulatory system whereby the first branch line starting from the control valve terminates in the line of the auxiliary cooling circulatory system leading from the charging-air cooler to the tank or reservoir. Also, such a connection of the two cooling circulatory systems enables an additional cooling of the cooling liquid of the main circulatory system by means of the cooled cooling liquid of the auxiliary cooling circulatory system, even though in this case the cooler or condenser of the auxiliary cooling circulatory system may be continued to be utilized for cooling of the charging-air.

According to a preferred construction of the last-mentioned embodiment of the present invention, a second control valve is arranged in the line of the auxiliary circulatory system leading from the reservoir to the thermostat downstream of the branching place of the second branch line which second control valve short-circuits or by-passes the liquid stream leaving the charging-air cooler or condenser by way of a third branch line, starting upstream of the discharge place of the first branch line, with the line leading back to the thermostat and the cooler in dependence on the operative connection or association of the part of the auxiliary cooling circulatory system including the reservior or tank to the main circulatory system. With such a connection, only the reservoir or tank with its stored cooled cooling liquid is connected with the main circulatory system whereas the second part of the auxiliary cooling circulatory system associated with the cooler or condenser forms a separate circulatory system exclusively for the cooling of the charging-air cooler or condenser.

The second control valve may, according to a further constructive realization of the present invention, increasingly interrupt the line from the reservoir or tank to the thermostat simultaneously with increasing by-pass of the aforementioned part of the auxiliary circulatory system. However, if the operating conditions should be such that the cooler or condenser of the auxiliary circulatory system is no longer fully utilized for charging-air cooling which now exists alone, then the interrupting action of the second control valve may, according to another construction of the present invention, be adapted to be cancelled or annulled by means of the thermostat when the cooling liquid temperature falls below a certain value. Consequently, a portion of the cooling output of the cooler or condenser continues to be available for the cooling of the cooling liquid disposed in the reservoir or tank so that also a correspondingly more effective additional cooling of the main circulatory system is possible.

In order that a still further additional cooling is made possible when the cooling possibility by means of the cooling liquid disposed in the reservoir or tank is fully utilized, provision is made according to still another construction of the present invention either to render evaporable a certain portion of the cooling liquid content of the reservoir or tank connected to the main circulatory system by way of an excess pressure valve of the otherwise closed tank or reservoir or to provide in the reservoir or tank a material, for example, wax, removing melting heat or heat of fusion from the cooling liquid above a relatively higher temperature lying, however, below the evaporation temperature thereof, which material changes again into its solid state still above the lower cooling temperature of the reservoir liquid. Whereas in the first case, the heat of evaporation is utilized for the further cooling, the melting heat necessary for the melting of the aforementioned material is removed from the reservoir liquid.

Accordingly, it is an object of the present invention to provide a liquid cooling system for an internal combustion engine which obviates by simple means the aforementioned shortcomings and drawbacks encountered with the prior art constructions.

Another object of the present invention resides in liquid cooling systems of internal combustion engines which may be so constructed and arranged that the coolers or condensers thereof can be designed for operating conditions less than the maximum load conditions of the engine without jeopardizing sufficient cooling under full load or emergency overload operations.

A further object of the present invention resides in a cooling system for internal combustion engines of the type described above which is simple in construction yet highly effective and reliable in operation for its intended purposes.

Still a further object of the present invention resides in a cooling system for internal combustion engines which can be more readily accommodated in the available space.

These and further objects, features, and advantages of the present invention will become more obvious from the following description when taken in connection with the accompanying drawing which shows, for purposes of illustration only, two embodiments in accordance with the present invention, and wherein:

FIGURE 1 is a schematic view of a first embodiment of a cooling system in accordance with the present invention; and FIGURE 2 is a schematic view of a second embodiment of a cooling system in accordance with the present invention.

Referring now to the drawing wherein like reference numerals are used throughout the two views to designate like parts, and more particularly to FIGURE 1, the liquid cooling system of an internal combustion engine 1 illustrated therein comprises a main cooling circulatory system and an auxiliary cooling circulatory system adapted to be connected to the main cooling circulatory system in a manner to be described more fully hereinafter.

The main cooling circulatory system includes a line 3 leading from the usual cooling water jacket (not shown in detail) of the internal combustion engine 1 to a cooler or condenser 2 as well as a line 4 leading back from the cooler or condenser 2 to the aforementioned cooling water jacket of the internal combustion engine 1. Even though the embodiments described herein mention customary cooling water as cooling liquid, it is to be understood that instead of cooling water also any other cooling fluid may be utilized within the scope of the present invention. A thermostat 5 is arranged in the line 3 near the cooler or condenser 2 and a pump 6 for circulating the cooling water in the line 4.

According to the embodiment of FIGURE 1, an auxiliary circulatory system is provided in addition to the main circulatory system described above. The auxiliary circulatory system includes a tank or reservoir 7 substantially filled with cooling water, a cooler or condenser 10 connected with the tank or reservoir 7 by way of lines 8 and 9, and a pump 11 for circulating the cooling water in the line 9 leading back from the cooler 10 to the reservoir 7 and located near the cooler or condenser 10. Furthermore, ac ontrol valve 12 is arranged in the line 3 of the main circulatory system near the internal combustion engine 1. A first branch line 13 starts from the control valve 12 and discharges in the line 8 of the auxiliary circulatory system near the cooler or condenser 10. Finally, a second branch line 14 leads from the line 8 at a place between the tank 7 and the discharge place of the first branch line 13 to the line 3; the second branch line 14 terminates in the line 3 of the main circulatory system at a place located between the control valve 12 and the thermostat 5.

Whereas the cooler or condenser 2 of the main circulatory system is designed for a cooling output which amounts, for example, to only about 65% of the practically possible maximum load of the internal combustion engine 1, the cooler 10 of the auxiliary circulatory system is designed for a cooling output which amounts to less than 35%, for example, to only 20% of the cooling output which may occur with a practically possible maximum load of the internal combustion engine 1. The over-all cooling surface thus amounts to only about 85% of the maximum necessary cooling surface, i.e., the cooling surface necessary for example, at a full-load operation and with an atmospheric air temperature of 50° C.

The fully enclosed tank or reservoir 7 is connected by way of a drainage or venting line 15 of small internal diameter or cross section, which starts from the tank bottom, with a place of the main circulatory system located within the area of the cooling water discharge out of the internal combustion engine 1 and is further connected by way of a thin or small line 16, also starting from its bottom and of small internal diameter or cross section, with the highest place of the cooler 10 which, in its turn, is connected from a place of its bottom by way of a further similar line 17 with the highest place of the cooler or condenser 2 of the main circulatory system.

Finally, the fully enclosed tank or reservoir 7 is provided at a place of its ceiling wall with an excess pressure valve 18 of conventional construction, which is able to act as vapor escape means in a manner to be described more fully hereinafter.

*Operation*

The cooling system described hereinabove in connection with FIGURE 1 operates as follows:

As long as the cooling water temperature measured at the thermostat 5 is below a predetermined maximum value of, for example, 105° C., the control valve 12 controlled by the thermostat 5 in any conventional manner is so controlled that the first branch line 13 is disconnected from the normally operating main circulatory system. If the cooling water temperature measured by the thermostat 5 exceeds the maximum permissive value, then the thermostat 5 so actuates the control valve 12 by any conventional means such as a mechanical, hydraulic or electric connection that the cooling water leaving the internal combustion engine 1 is now fed to a more or less large extent into the first branch line 13. In view of the simultaneous cooling water supply of the pump 11 of the auxiliary cooling circulatory system, the cooled water supplied from the tank 7 is now supplied simultaneously through the second branch line 14 into the line 3 of the main circulatory system and leads to a corresponding cooling of the cooling water flowing through the main circulatory system. The hot cooling water coming from the internal combustion engine 1, in contradistinction thereto, reaches by way of the first branch line 13, the cooler or condenser 10 of the auxiliary cooling circulatory system, from the latter in a correspondingly pre-cooled condition by way of the pump 11, the line 9, and the reservoir 7 as well as furthermore by way of a section of the line 8 and the second branch line 14 back into the line 3 of the main circulatory system where it now is further cooled by means of the cooler or condenser 2 and finally is conducted back again to the internal combustion engine 1 by way of the pump 6 and the line 4.

If the extreme full-load operation with an operatively associated auxiliary cooling circulatory system should last for a longer period of time, then one must expect with the altogether insufficient cooling surfaces of the two coolers or condensers 2 and 10, that the water temperature again exceeds the maximum permissive value and that the water filling the tank 7 up to the water level 19 finally begins to evaporate under the development of a corresponding excess pressure. The excess pressure valve 18 thereby opens and enables an escape of the thus-developed vapor. If the water level in the tank 7 should reach a minimum permissive level as a result of the evaporation, then the reduction of the engine load may be caused by a conventional safety means not illustrated in detail, for example, by a warning light, or also by an automatically operable shifting or switching means of conventional construction. In order that the water loss connected with the vapor escape is limited to a minimum, it is additionally appropriate that baffle plates or similar means of conventional construction (not shown) are arranged in the vapor discharge line leading to the excess pressure valve 18 for the retention of the water taken or torn along with the vapor.

The engagement of the warning lamp or of the automatically operable output changing means of the internal combustion engine 1 is finally a cause for the operator attending the engine for the refilling of the tank 7 with fresh cooling water in order that during the further operation, no cooling water shortage can occur.

In the second embodiment according to FIGURE 2, in which the same parts are again designated by the same reference numerals as in FIGURE 1, the internal combustion engine 1 is provided with an exhaust-gas turbo-charger 20 and with a charging-air cooler or condenser 21 of conventional construction in its charging air line starting from the exhaust gas turbo-charger 20. The charging-air cooler or condenser 21 is cooled by means of the cooling water of the auxiliary cooling circulatory system and is therefore shown once more in the line 9 of the auxiliary cooling circulatory system starting from the pump 11. It is understood, however, that only one single charging-air cooler or condenser 21 is, in fact, provided in the embodiment of FIGURE 2 which cools the charging-air by means of cooling water circulated by pump 11. The first branch line 13′, which starts from the control valve 12 of the main circulatory system, does not lead in this embodiment into the line 8 leading from the tank or reservoir 7 to the cooler or condenser 10 but instead into the line 9 leading from the cooler or condenser 10 to the tank 7 at a place between the charging-air cooler or condenser 21 and the tank 7. A thermostat 22 and a second control valve 23 are arranged in the line 8 between the branching place of the second branch line 14, constructed as to the rest as in the embodiment of FIGURE 1, with the thermostat 22 nearer the cooler or condenser 10 and the second control valve nearer the tank 7. The second control valve 23 is so coupled by conventional means not illustrated in detail herein with the control valve 12 of the main circulatory system that it interrupts at its place the auxiliary circulatory cooling system, corresponding during normal operation to that of the first embodiment, in case of operative association with the main circulatory system and in lieu thereof short-circuits or by-passes the part on the side of the cooler or condenser 10 of the auxiliary circulatory cooling system by way of a third branch line 24 leading from the valve 23 to the line 9. The consequence of such an arrangement is that when the auxiliary circulatory system is operatively connected with the main circulatory system, only the right part of the auxiliary cooling circulatory system containing the tank 7 is connected with the main circulatory system whereas the left part of the auxiliary cooling circulatory system forms by itself a circulation system for the cooling of the charging-air cooler or condenser 21. The cooler or condenser 10 is so designed in this case that it produces the cooling output necessary therefor.

In order that the cooling output of the cooler or condenser 10 may also be utilized additionally for the cooling of the main circulatory system notwithstanding the charging-air cooling, the control valve 23 is additionally so adapted to be controlled in an over-riding manner by means of the thermostat 22 in any conventional known manner that below a predetermined temperature as measured by the thermostat 22, it again partially establishes the connection from the reservoir or tank 7 to the cooler or condenser 10 by way of the control valve 23. This operative connection is indicated schematically in FIGURE 2 by the dotted line 25. The optimum utilization of the cooler or condenser 10 results if the aforementioned certain temperature is at the same time the permissive maximum temperature of the cooling water at the place of the thermostat 22 at which the desired charging-air cooling is just still barely assured by means of the charging-air cooler or condenser 21.

While I have shown and described two embodiments in accordance with the present invention, it is understood that the same is not limited thereto, but is susceptible of numerous changes and modifications as known to a person skilled in the art. For example, in order that the cooling water loss as a result of evaporation is avoided to the greatest possible extent, there may be provided in the reservoir tank 7 a material, for example, wax, removing melting heat or heat of fusion from the cooling water above a higher temperature which, however, is below the evaporating temperature thereof, which material again changes to its solid state above the lower cooling temperature of the tank liquid. The auxiliary cooling circulatory system or the portion thereof including the reservoir may also be adapted to be connected by way of the control valve to the main cooling circulatory system in proportion to the excess temperature of the thermostat. The cooling circulatory systems may also contain any other suitable cooling liquid or fluid instead of water and the charging of the internal combustion engine 1 according to the second embodiment may also take place instead of by means of an exhaust gas turbo-charger by a simple, mechanically driven supercharger or compressor without affecting the scope of the present invention.

Thus, it is obvious that the present invention is not limited to the details shown and described herein, and I therefore do not wish to be limited thereto, but intend to cover all such changes and modifications as are encompassed by the scope of the appended claims.

I claim:

1. A fluid cooling system for an internal combustion engine, comprising first cooling circulatory means including condenser means, cooling fluid pump means and thermostat means, said first cooling circulatory means being designed for a cooling output below the practically possible maximum load, auxiliary cooling circulatory means including reservoir means, auxiliary pump means and auxiliary condenser means, said auxiliary condenser means being normally connected only with said reservoir means via said auxiliary pump means and being thus adapted to have the cooling fluid thereof cooled down to a low temperature through circulation through said auxiliary condenser means, and connecting means selectively connecting said auxiliary circulatory cooling means with said first cooling circulatory means in response to said thermostat means in such a manner that the auxiliary circulatory means is operatively connected with said first circulatory cooling means upon the cooling fluid exceeding a predetermined temperature in the first cooling circulatory means.

2. A fluid cooling system for an internal combustion engine, comprising first cooling circulatory means including condenser means, cooling fluid pump means and thermostat means, said first cooling circulatory means being designed for a cooling output below the practically possible maximum load, second auxiliary cooling circulatory means including reservoir means, said auxiliary cooling circulatory means being normally connected only with said reservoir means and being thus adapted to have the cooling fluid thereof cooled down to a low temperature, and connecting means operatively connecting said auxiliary circulatory cooling means with said first cooling circulatory means in such a manner that the auxiliary circulatory means is operatively connected with said first circulatory cooling means upon exceeding a predetermined temperature in the first cooling circulatory means, wherein said main cooling circulatory means includes first line means leading from the internal combustion engine to the condenser means, said thermostat means being connected in said first line means, control valve means in said first line means operatively connected with said thermostat means to be controlled thereby, said auxiliary circulatory means including a first line leading from said reservoir means to the auxiliary condenser means of the auxiliary circulatory means, said connecting means including a first branch line leading from said control valve means to the first line of said auxiliary circulatory means at a place near and upstream of the condenser means thereof, and a second branch line leading from said last-mentioned first line at a place nearer said reservoir means into the first line means of the first circulatory means between the control valve means and the thermostat means thereof, and said control valve means controlling the cooling fluid leaving the internal combustion engine in dependence on the temperature measured by said thermostat means to flow above a predetermined temperature by way of said first branch line into the first line of said auxiliary circulatory means.

3. A fluid cooling system for an internal combustion engine, comprising first cooling circulatory means including condenser means, cooling fluid pump means and thermostat means, said first cooling circulatory means being designed for a cooling output below the practically possible maximum load, second auxiliary cooling circulatory means including reservoir means, said auxiliary cooling circulatory means being normally connected only with said reservoir means and being thus adapted to have the cooling fluid thereof cooled down to a low temperature, and connecting means operatively connecting said auxiliary circulatory cooling means with said first cooling circulatory means in such a manner that the auxiliary circulatory means is operatively connected with said first circulatory cooling means upon exceeding a predetermined temperature in the first cooling circulatory means, further comprising charging means operatively connected with a charging-air line for supplying charging-air to said internal combustion engine, said auxiliary circulatory means including a first line and a second line, said second line being provided with a cooling fluid pump means, charging-air cooler means connected in the second line of said auxiliary circulatory means downstream to the cooling fluid pump means thereof, said charging-air cooler means being also operatively connected in the charging-air line leading from said charging means to the internal combustion engine downstream of said charging means, said first circulatory means including a first line means containing said thermostat means and control valve means located upstream of said thermostat means and a second line means including pump means leading from the condenser means of the first circulatory cooling means to said engine, a first branch line leading from said control valve means to the second line of said auxiliary circulatory means and being controlled by said control valve means, said control valve means being operatively connected with and controlled by said thermostat means.

4. A cooling system according to claim 3, further comprising a second branch line leading from the first line of said auxiliary circulatory means to the first line of said main circulatory means at a point intermediate said control valve means and said thermostat means, second control valve means arranged in the first line of said auxiliary circulatory means downstream of the branching connection of the second branch line, a third branch line connecting the second control valve means with the second line of the auxiliary circulatory means, said second control valve means being operable to short-circuit the fluid stream leaving said charging-air cooler means by way of the third branch line, which terminates in the second line of said auxiliary circulatory means upstream of the discharge place of the first branch line, with the first line of the auxiliary circulatory means in dependence on the operative connection of the section of the auxiliary circulatory cooling means containing the reservoir means with the main circulatory cooling means.

5. A cooling system according to claim 4, wherein said second control valve means at the same time interrupts in its short-circuiting position the first line of the auxiliary circulatory means leading from the reservoir means to the second thermostat means.

6. A cooling system according to claim 5, further comprising over-riding control means operatively connecting said second thermostat means with said second control valve means to cancel the interrupting action of said second control valve means with a cooling fluid temperature below a predetermined value.

7. A cooling system according to claim 6, wherein the cooling output of the cooler means of the auxiliary circulatory means is matched to the quantity of heat to be taken off by the charging-air cooler means.

8. A cooling system according to claim 6, wherein the section of the auxiliary circulatory means containing the reservoir means is adapted to be connected by way of the first-mentioned thermostat means to the main circulatory means to an extent corresponding to the excess temperature of the first thermostat means.

9. A cooling system according to claim 6, further comprising separate line means of small inner diameter operatively connecting the bottom of said reservoir means with the cooling fluid discharge place of the internal combustion engine and with the condenser means of both circulatory cooling means.

10. A cooling system according to claim 6, wherein a certain portion of the fluid content of the reservoir means connected with the main circulatory means is adapted to be evaporated by way of an excess pressure valve out of the otherwise closed reservoir means.

11. A cooling system according to claim 10, further comprising means in said reservoir means containing a material removing heat of fusion from the cooling fluid above a higher temperature which, however, lies below the evaporating temperature of the cooling fluid, said material being again changed into its solid state above the lower cooling temperature of the reservoir fluid.

12. A cooling system according to claim 6, further comprising means in said reservoir means containing a material removing heat of fusion from the cooling fluid above a higher temperature which, however, lies below the evaporating temperature of the cooling fluid, said material being again changed into its solid state above the lower cooling temperature of the reservoir fluid.

13. A cooling system according to claim 3, wherein the cooling output of the cooler means of the auxiliary circulatory means is matched to the quantity of heat to be taken off by the charging-air cooler means.

14. A cooling system according to claim 3, wherein the section of the auxiliary circulatory means containing the reservoir means is adapted to be connected by way of the first-mentioned thermostat means to the main circulatory means to an extent corresponding to the excess temperature of the first thermostat means.

15. A cooling system according to claim 3, further comprising separate line means of small inner diameter operatively connecting the bottom of said reservoir means with the cooling fluid discharge place of the internal combustion engine and with the condenser means of both circulatory cooling means.

16. A cooling system according to claim 3, wherein a certain portion of the fluid content of the reservoir means connected with the main circulatory means is adapted to be evaporated by way of an excess pressure valve out of the otherwise closed reservoir means.

17. A cooling system according to claim 1, wherein the section of the auxiliary circulatory means containing the reservoir means is adapted to be connected by way of the first-mentioned thermostat means to the main circulatory means to an extent corresponding to the excess temperature of the first thermostat means.

18. A cooling system according to claim 1, further comprising separate line means of small inner diameter compared to said connecting means operatively connecting the bottom of said reservoir means with the cooling fluid discharge place of the internal combustion engine and with the condenser means of both circulatory cooling means, said reservoir means being positioned at a higher elevation than both said condenser means.

19. A cooling system according to claim 1, wherein a certain portion of the fluid content of the reservoir means connected with the main circulatory means is adapted to be evaporated by way of an excess pressure valve out of the otherwise closed reservoir means.

References Cited

UNITED STATES PATENTS

| | | | |
|---|---|---|---|
| 1,236,813 | 8/1917 | Zimmerman. | |
| 1,892,571 | 12/1932 | Goodwin. | |
| 2,032,876 | 3/1936 | Haltenberger | 123—41.51 |
| 2,164,545 | 7/1939 | Rogers | 123—119 |
| 2,396,338 | 3/1946 | Newton | 165—18 |
| 2,597,061 | 5/1952 | Burich | 123—41.08 |
| 2,633,698 | 4/1953 | Nettel | 60—13 |
| 3,232,044 | 2/1966 | Gratzmuller | 60—13 |

AL LAWRENCE SMITH, *Primary Examiner.*

U.S. Cl. X.R.

60—13; 123—41.29, 41.31, 41.51, 41.54